US009445450B2

(12) United States Patent
Dalsgaard et al.

(10) Patent No.: US 9,445,450 B2
(45) Date of Patent: Sep. 13, 2016

(54) METHOD AND APPARATUS FOR PRESERVING PHYSICAL UPLINK CONTROL CHANNEL RESOURCES

(75) Inventors: Lars Dalsgaard, Oulu (FI); Jussi-Pekka Koskinen, Oulu (FI); Esa Mikael Malkamaki, Espoo (FI); Ilkka Antero Keskitalo, Oulu (FI); Jarkko Tuomo Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 57 days.

(21) Appl. No.: 14/371,396

(22) PCT Filed: Jan. 31, 2012

(86) PCT No.: PCT/IB2012/050455
§ 371 (c)(1),
(2), (4) Date: Jul. 9, 2014

(87) PCT Pub. No.: WO2013/114157
PCT Pub. Date: Aug. 8, 2013

(65) Prior Publication Data
US 2015/0003355 A1    Jan. 1, 2015

(51) Int. Cl.
*H04W 4/00* (2009.01)
*H04W 76/02* (2009.01)
*H04W 74/00* (2009.01)
*H04W 72/04* (2009.01)
*H04W 76/06* (2009.01)
*H04W 74/08* (2009.01)

(52) U.S. Cl.
CPC ....... *H04W 76/028* (2013.01); *H04W 72/0413* (2013.01); *H04W 74/006* (2013.01); *H04W 76/068* (2013.01); *H04W 74/0833* (2013.01)

(58) Field of Classification Search
CPC ......... H04W 76/028; H04W 72/0413; H04W 74/006; H04W 76/068; H04W 74/0833
See application file for complete search history.

(56) References Cited

U.S. PATENT DOCUMENTS

| 7,957,298 | B2* | 6/2011 | Yi | H04W 74/002 370/242 |
| 8,243,672 | B2* | 8/2012 | Park | H04W 56/004 370/281 |
| 8,274,936 | B2* | 9/2012 | Yoo | H04L 5/0078 370/329 |

(Continued)

FOREIGN PATENT DOCUMENTS

| EP | 2375848 | 10/2011 |
| WO | 2009136706 | 11/2009 |
| WO | 2011/153925 A1 | 12/2011 |

OTHER PUBLICATIONS

International Search Report and Written Opinion received for corresponding Patent Cooperation Treaty Application No. PCT/IB2012/050455, dated Feb. 2, 2013, 15 pages.
3GPP Organizational Partners (Arib et al) "3GPP TS 36.321 V8.2.0—Evolved Universal Terrestrial Radio Access (E-UTRA) Medium Access Control (MAC) protocol specification (Release 8)", 3rd Generation Partnership Project-Technical Specification Group Radio Access network vol. 36.321, No. V8.2.0, May 1, 2008 pp. 1-33; pp. 11-21, 26-28.

(Continued)

*Primary Examiner* — Brian O'Connor
(74) *Attorney, Agent, or Firm* — Mintz Levin Cohn Ferris Glovsky and Popeo, P.C.

(57) ABSTRACT

A network configuration and process are disclosed in which a user equipment preserves its physical uplink control channel resources (PUCCH) in connected mode when so instructed by the network upon expiration of a time alignment timer. Upon re-initiation of network messaging the network passes information to the user equipment during random access signalling to re-use the physical uplink control channel resources.

18 Claims, 6 Drawing Sheets

(56) References Cited

U.S. PATENT DOCUMENTS

| | | | | |
|---|---|---|---|---|
| 8,312,336 B2* | 11/2012 | Chun | H04L 1/1822 714/748 |
| 9,030,978 B2* | 5/2015 | Suzuki | H04W 4/20 370/310 |
| 9,049,655 B2* | 6/2015 | Park | H04W 56/0045 |
| 9,078,236 B2* | 7/2015 | Chun | H04W 74/008 |
| 2011/0249635 A1* | 10/2011 | Chen | H04W 76/068 370/329 |
| 2014/0079032 A1* | 3/2014 | Bergstrom | H04W 56/0005 370/336 |

OTHER PUBLICATIONS

Fujitsu, "TAT expiry during RA procedure", In: 3GPP draft; R2-084479 TAT expiry during RA procedure, 3rd Generation Partnership Project (3GPP), Mobile Competence Centre, 650 route des Lucioles; F-06921 Sophoa-Antipolis Cedex; France, No. Jeju Aug. 12, 2008.

Extended European Search Report received for corresponding European Patent Application No. 12867258.1, dated Dec. 9, 2015, 9 pages.

* cited by examiner

METHOD AND APPARATUS FOR PRESERVING PHYSICAL UPLINK CONTROL CHANNEL RESOURCES

RELATED APPLICATION

This application was originally filed as PCT Application No. PCT/IB2012/050455 filed Jan. 31, 2012.

TECHNOLOGICAL FIELD

An example embodiment of the present invention relates to the field of mobile communications, and more particularly, to the optimization of "always-on" type connections in mobile networks and associated devices such as smart phones.

BACKGROUND

The evolving networks and new types of terminals, particularly smart phone type terminals, are gradually changing the characteristics of mobile communications traffic. There will be more and more applications requiring always-on type of connections. This trend gives rise to a number of challenges both in the radio access network load as well as in the terminal. The network may have issues with signaling load caused by a large number of connected UEs (user equipment) doing handovers or UEs changing the state between idle and connected.

Smart phones will generate traffic when unattended if certain applications are launched. Applications like social networking (e.g. Facebook), instant messaging (e.g., Nimbuzz, Skype) or the like will generate status updates, polling, "keep alive" or similar traffic even when the applications are not actively used. The traffic typically consists of small packets (or bursts of packets) sent intermittently. Also different operating systems (OS) may check various updates regularly.

Despite being "always-on," the UE power consumption should be close to the idle mode power consumption when the services are not actively used. The UEs can be configured with DRX (discontinuous reception), or they can be placed into an idle state between the data transmissions allowing sufficient "sleep" times at the UE.

When optimizing the UE power consumption and/or network signaling load, the network should also allow appropriate service quality for data transfer when the user starts actively using a certain service/application. This gives rise to somewhat conflicting requirements for the UE configuration in order to be able to react fast enough to the coming data.

When in connected mode and with DRX configured, the UE is allocated uplink (UL) resources for possible radio resource requests (e.g., scheduling requests or SRs). The UL resource reservation is for the PUCCH (physical uplink control channel) and the reservation is kept as long as the UL synchronization is assumed to be valid, that is, the timing advance value (needed to align the UL transmissions from different terminals) is assumed to be within the allowed tolerance. The validity is controlled by a timer, namely a TAT, (time alignment timer), which is configured by the network. At the expiration of the timer, the UE releases the PUCCH resources and initiates the following data transfers with the RA (random access) procedure.

In LTE (long term evolution) or LTE-Advanced (LTE-A) networks the state transitions, DRX configuration and the usage of PUCCH resources are controlled by the network. To reach the optimum operation both from the UE and network perspective calls for more sophisticated features to be developed.

When in connected mode and the Time Alignment Timer (TAT) expires, the current procedure mandates that the UE release the PUCCH resources. The TAT needs to be kept up to date in order to keep UE uplink synchronization and the PUCCH resources allocated. Keeping the timer updated triggers continuous signaling (unless infinity time is configured by network). The network has to send a TA (timing advance) command MAC CE (medium access control element) before the TAT expires. Every time the TA command is sent, it activates the DRX inactivity timer which causes extra power consumption.

Figure 3:
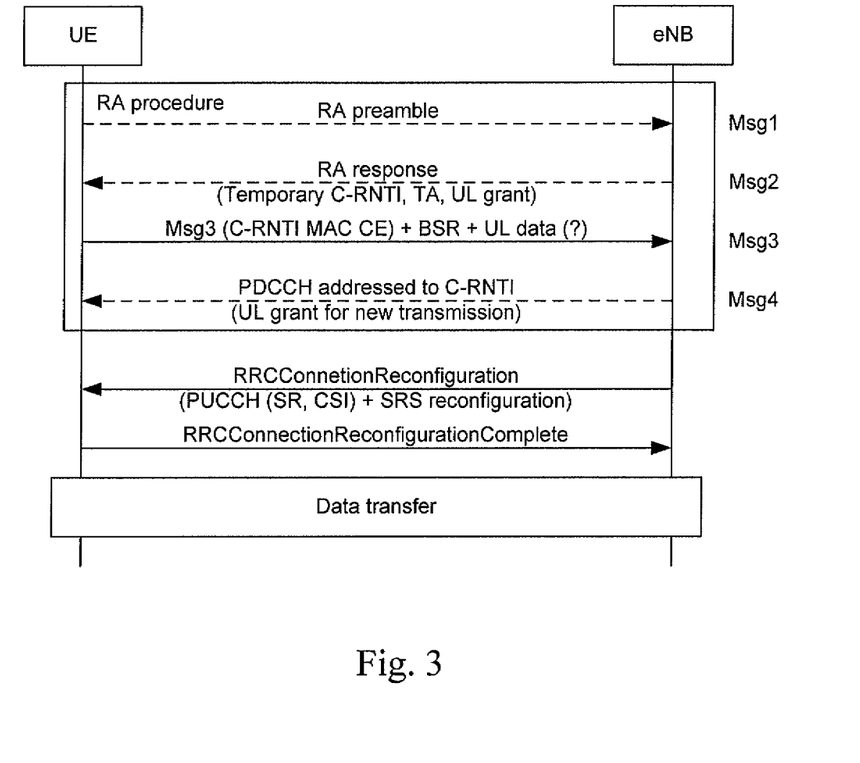
FIG. 3 presents a signal diagram of the present process for reconfiguration for uplink communication after TAT expires.

If the network lets TAT expire, PUCCH resources are released by the UE and UE has to start any uplink transmission with random access. After that the network has to signal the reconfiguration of the PUCCH resources to the UE with a RRC (radio resource control) Connection Reconfiguration procedure. A similar problem exists for the downlink transmission and the network needs to synchronize the UE UL (e.g., send a TA command typically using random access response), because otherwise the UE cannot transmit HARQ ACK (hybrid automatic repeat request acknowledgement) for the downlink transmission. FIG. 3 illustrates the contention based random access procedure after TAT has expired when the UE is in the connected mode and has C-RNTI (cell radio network temporary identifier) allocated. This procedure is used when UL data arrives in the UE. Contention resolution in this case is done with a PDCCH (physical downlink control channel) message to a UE's C-RNTI containing an UL grant for a new transmission (Msg 4, FIG. 3).

Figure 4:
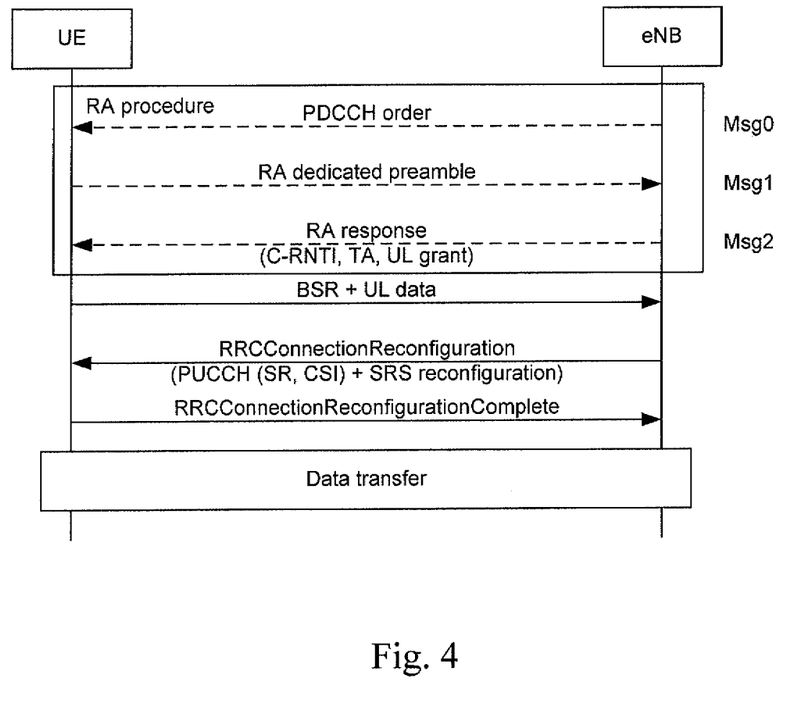
FIG. 4 presents a signal diagram of the present process for reconfiguration for downlink communication after TAT expires.

FIG. 4 illustrates the contention free random access procedure after TAT has expired. When the UE is in connected mode and has C-RNTI allocated. This procedure is used when DL data arrives in the UE after TAT expiry. It starts with a PDCCH order from eNB (evolved Node B) (Msg 0, FIG. 4). In this case no contention resolution is needed. Both figures indicate that RRC Connection Reconfiguration is needed after random access to reconfigure the PUCCH resources.

BRIEF SUMMARY

A method, apparatus and computer program product are provided according to one embodiment of the present invention in which the network instructs the user equipment to preserve its physical uplink control channel resources after a period of discontinuous use. In one embodiment of the method, apparatus and computer program product the user equipment stores the physical uplink control channel resources for re-use upon the resumption of network communications after its time alignment timer expires. When communication resumes between the user equipment and the network, the network instructs the user equipment device to re-use the physical uplink control channel resources that it stored. By preserving the physical uplink control channel resources the overall message load on the network is reduced and the user experiences decreased latency in resumed communications.

In one embodiment, a method is provided for receiving a message to preserve physical uplink control channel resources upon expiration of a time alignment timer, and causing the physical uplink control channel resource allocation to be stored upon expiration of the time alignment timer. The method further comprises re-initiating a connection with a network using random access channel signaling. The method further comprises receiving a message during re-initiation of the connection with the network node that instructs the stored physical uplink control channel resources to be re-used. The method further comprises retrieving the stored physical uplink control channel resources and comprising employing the stored and retrieved uplink control channel resources in re-initiated network communications.

In another embodiment, an apparatus is provided comprising at least one processor, one communications interface, computer program code, and at least one memory that cause the apparatus to at least preserve physical uplink control channel resources upon expiration of a time alignment timer, cause the physical uplink control channel resource allocation to be stored upon expiration of the time alignment timer. The apparatus further comprises the at least one processor, communications interface, memory and the computer program code are further configured to receive an instruction re-initiating a connection with a network using random access channel signaling, and to receive a message during re-initiation of the connection with the network node that instructs the stored physical uplink control channel resources to be re-used. The apparatus is further configured to retrieve the stored physical uplink control channel resources and to employ the stored and retrieved uplink control channel resources in re-initiated network communications.

In another embodiment, a computer program product is provided comprising at least one non-transitory computer-readable storage medium having executable computer-readable program code instructions stored therein, the computer-readable program code instructions configured to enable receipt of a message to preserve physical uplink control channel resources upon expiration of a time alignment timer, and cause the physical uplink control channel resource allocation to be stored upon expiration of the time alignment timer. The computer-executable program code portions of this embodiment also include program instructions further configured to re-initiate a connection with a network node using random access signaling and cause re-use of the stored physical uplink control channel resources upon re-initiation of network communication after a period of inactivity.

In another embodiment, an apparatus is provided comprising a means for receiving a message to preserve physical uplink control channel resources upon expiration of a time alignment timer, and means for storing the physical uplink control channel resources upon expiration of a time alignment timer. The apparatus of this embodiment further comprises means for receiving an instruction to re-use the physical uplink control channel resources, means for retrieving the physical uplink control channel resources from the storage and means for re-using the retrieved physical uplink control channel resources in subsequent network communications.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Figure 1:
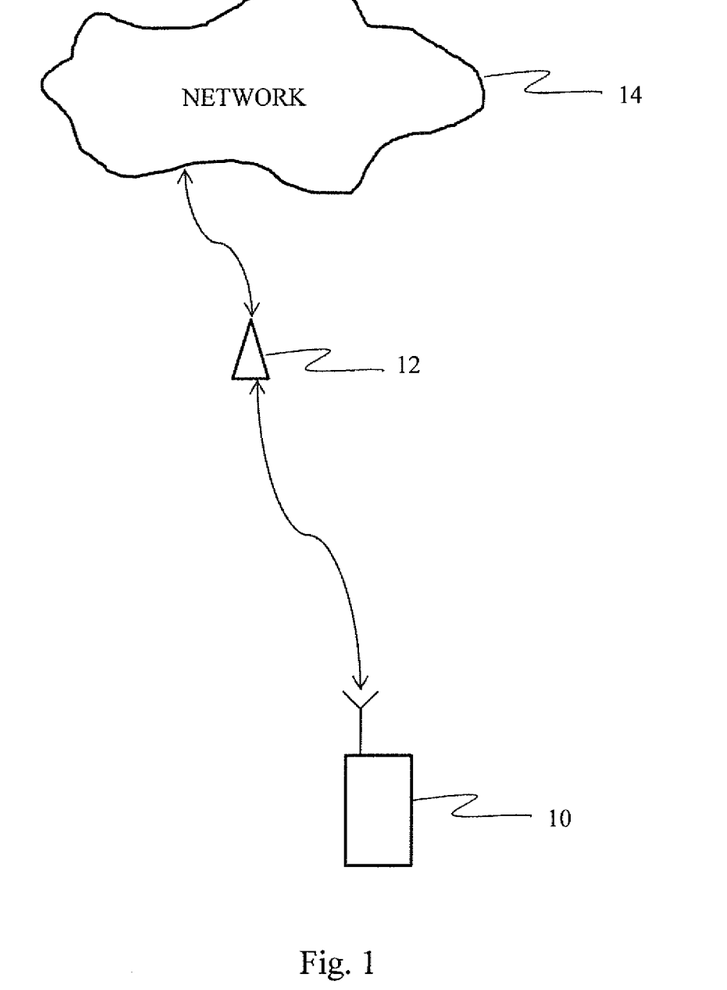
FIG. 1 is a schematic representation of a network connection to a mobile terminal through an access node.

Referring now to FIG. 1, mobile terminals 10 may communicate with a network 14 utilizing an uplink from the mobile terminal 10 to the network 14 and a downlink from the network 14 to the mobile terminal. The mobile terminals 10 may be of various types of mobile communication devices such as, for example, mobile telephones, personal digital assistants, pagers, laptop computers, tablet computers, or any of numerous other hand held or portable communication devices, computation devices, content generation devices, content consumption devices, or combinations thereof, generally termed "user equipment" (UE). The mobile terminal 10 may communicate with a network via an access point 12, such as an Node B, an evolved Node B (eNB), a base station or the like, each of which comprises a radio frequency transmitter and receiver. The mobile terminal 10 may communicate with various types of networks 14 including, for example, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network, a Universal Terrestrial Radio Access Network (UTRAN), a GSM Edge Radio Access Network (GERAN) or other type of network.

Figure 2:
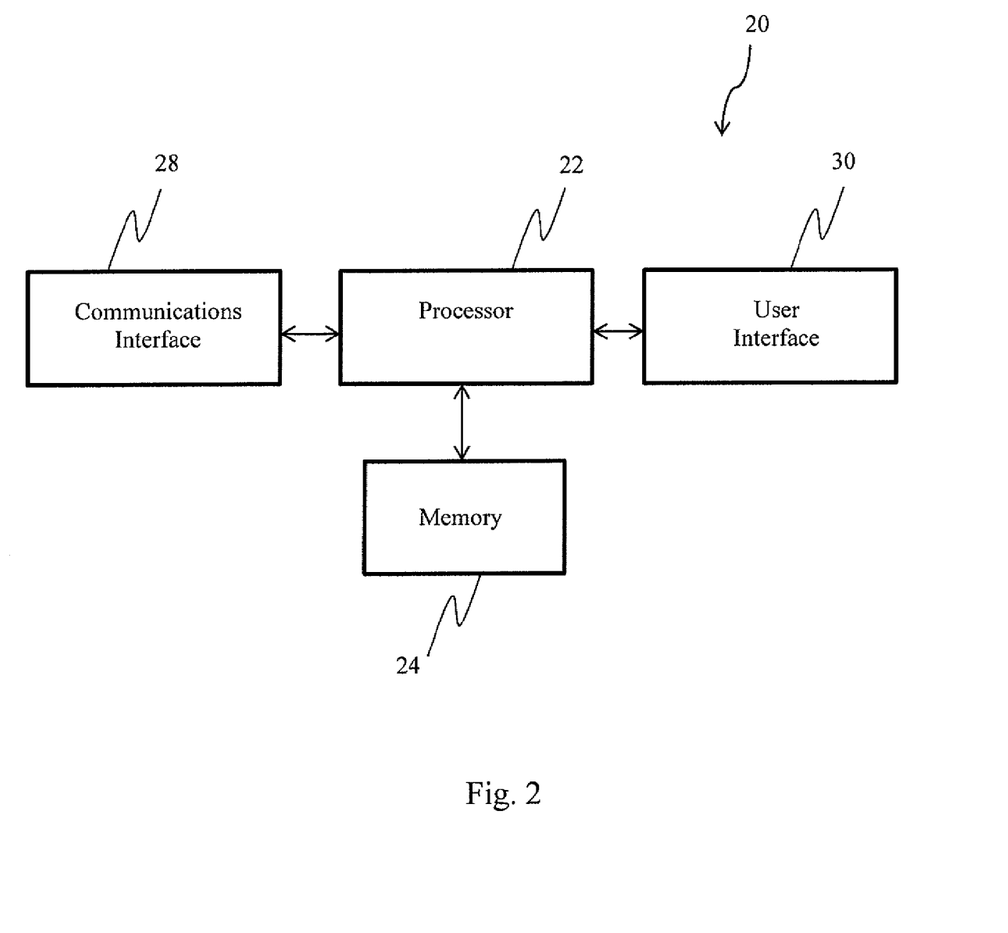
FIG. 2 is a block diagram of an apparatus from the perspective of a mobile terminal that may be configured to perform the operations of an example embodiment of the present invention.

Referring now to FIG. 2, an apparatus 20 that may be embodied by or otherwise associated with a mobile terminal 10 (user equipment UE) for preserving its physical uplink control channel resources may include or otherwise be in communication with a processor 22, a memory device 24, a communication interface 28, and a user interface 30.

In some example embodiments, the processor 22 (and/or co-processors or any other processing circuitry assisting or otherwise associated with the processor) may be in communication with the memory device 24 via a bus for passing information among components of the apparatus 20. The memory device 24 may include, for example, one or more non-transitory volatile and/or non-volatile memories. In other words, for example, the memory device 24 may be an electronic storage device (e.g., a computer readable storage medium) comprising gates configured to store data (e.g., bits) that may be retrievable by a machine (e.g., a computing device like the processor). The memory device 24 may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device 24 could be configured to store instructions for execution by the processor 22.

The apparatus 20 may, in some embodiments, be embodied by a mobile terminal 10. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading. In the embodiment in which the apparatus 20 is embodied as a mobile terminal 10, the processor may be embodied by the processor of the mobile terminal.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal 10) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 28 may be any means such as a device or circuitry embodied in either hardware or a combination of hardware and software that is configured to receive and/or transmit data from/to a network 12 and/or any other device or module in communication with the apparatus 20. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some example embodiments, such as instances in which the apparatus 20 is embodied by a mobile terminal 10, the apparatus may include a user interface 30 that may, in turn, be in communication with the processor 22 to receive an indication of a user input and/or to cause provision of an audible, visual, mechanical or other output to the user. As such, the user interface may include, for example, a keyboard, a mouse, a joystick, a display, a touch screen(s), touch areas, soft keys, a microphone, a speaker, or other input/output mechanisms. Alternatively or additionally, the processor may comprise user interface circuitry configured to control at least some functions of one or more user interface elements such as, for example, a speaker, ringer, microphone, display, and/or the like. The processor and/or user interface circuitry comprising the processor may be configured to control one or more functions of one or more user interface elements through computer program instructions (e.g., software and/or firmware) stored on a memory accessible to the processor (e.g., memory device and/or the like).

Figure 5:
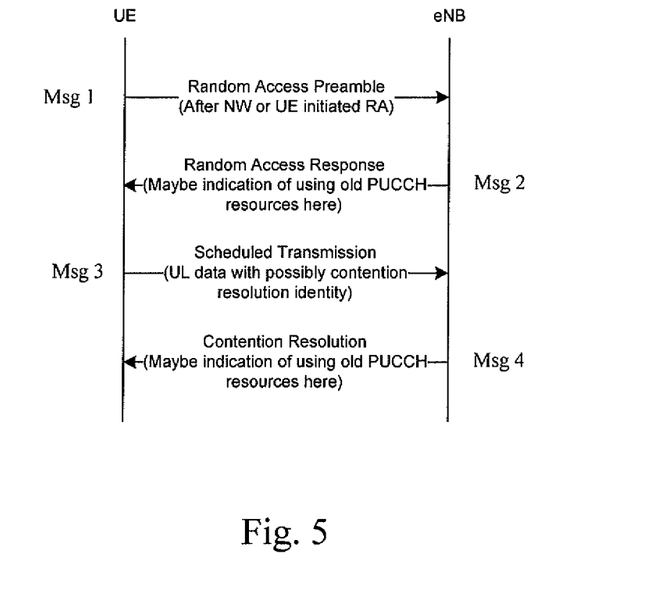
FIG. 5 presents a signal diagram of the process of one embodiment of the invention.

FIG. 5 illustrates one example of signaling between a UE and an eNB in order to reserve UL (uplink) or DL (downlink) resources. Following initiation of RA by either one of UE or the network, one UE may cause a RA preamble to be transmitted to one eNB in Msg1. The eNB may respond with a RA response in Msg2. The UE may, in turn, cause UL data to be provided to one eNB in accordance upon a scheduled transmission in Msg3 including, optionally, contention resolution information. Finally, one eNB may provide a contention resolution message in Msg4 to the UE.

In order to improve (shorten) uplink and downlink transmission delay and decrease signaling, a UE configured in accordance with an example embodiment of the present invention does not release the PUCCH resources when a timer such as TAT expires. Instead, the UE is instructed by the network that it should not release the PUCCH resource at TAT expiry while, for example, in RRC Connected mode. When the connection is initiated again (for example using RACH in connected mode) the network can indicate to the UE whether to re-use the prior PUCCH configuration or whether a new PUCCH configuration will be configured. Referring to FIG. 5, this indication could be delivered with a random access response (RAR, Msg2) or appear in message 4 during the random access procedure.

The presently employed procedure concerning UE behavior can be changed so that the PUCCH allocation is stored when the TAT expires in order to allow resumption of the previous configuration. Naturally, PUCCH allocation is stored when it is received from eNB in RRC Reconfiguration message. When TAT expires, UE does not flush the memory where PUCCH allocation is kept but instead keeps the allocation even if TAT expires. For this purpose, an IE (information element) could be added to PUCCH configuration to indicate that the configuration should be kept at TAT expiry. Though TAT expiry may often be the event that causes the PUCCH allocation to be stored for later re-use, it may also be advantageous to preserve PUCCH resources upon other considerations. The signaling description herein can be adapted to occur when PUCCH resource re-use is desirable with or without linkage to TAT expiration.

A first solution is to send the 're-use PUCCH resource' indication to cause the equipment to use the earlier PUCCH resources. In the signaling example of FIG. 5, the 're-use PUCCH resource' information could be included in Msg4. Upon receiving this indication the UE resumes usage of the previously configured PUCCH resources without need for any new configuration.

In this case wherein the network indicates that the UE shall re-use the former allocated PUCCH resources, it is assumed that the network has not re-allocated those PUCCH resources to other UEs. They are still available and the UE applies the formerly configured PUCCH configuration.

In case the network indicates that the UE shall not re-use the formerly configured PUCCH resources, the UE releases the stored PUCCH configuration and awaits a new PUCCH configuration. This new configuration may be established according to the currently existing protocols of FIGS. 3 and 4, for example.

With the indication of re-using the old PUCCH configuration, there is no need to send RRCConnectionReconfiguration and RRCConnectionReconfigurationComplete messages (See FIGS. 3 and 4) while resuming the data transmission. This speeds up the re-start of the data transfer and reduces the signaling load in the network. Network wide the signaling reduction can be significant, especially in the case where there is large number of smart phones connected with allocated resources but generating only intermittent traffic.

For DL data arrival, RA procedure is started with PDCCH order followed by the UE sending a dedicated preamble (see Msg 1, FIG. 5). The procedure is in this case contention free. The indication to re-use the old PUCCH resources could be sent together with the PDCCH order (Msg 0) (layer 1 signaling) or with the RAR (Random Access Response) (Msg 2) (MAC layer signaling) as indicated in FIG. 5.

For UL data arrival, UE MAC starts random access by sending a random preamble. In this case eNB cannot send an indication to reuse old PUCCH resources before it knows which UE sent the random access preamble. Thus the first possibility for notification to re-use the PUCCH is Msg 4 as indicated in FIG. 5. For a connected mode UE which already has C-RNTI allocated, the contention resolution is finished by sending an UL grant for a new transmission using PDCCH addressed to the UE's C-RNTI. In this case the indication could be added in the UL grant sent on PDCCH (layer 1 signaling)(shown in FIGS. 3 and 4). The UE would start using the prior PUCCH resources only after a successful contention resolution. Alternatively, the indication could be added to RAR in which case the UE would start to use the prior PUCCH resources immediately after starting TAT and would have to stop using them later if the contention resolution is not successful. Alternatively, the indication could be in RAR but UE would start using the resources only after contention resolution is successful. Furthermore, the indication could be sent in a separate DL transmission, e.g., a new MAC CE could be specified for the indication and that MAC CE would be sent after Msg4 or the PDCCH addressed to C-RNTI of the UE could be a DL assignment on PDSCH where the MAC CE would be sent alone or together with other DL data.

Figure 6:
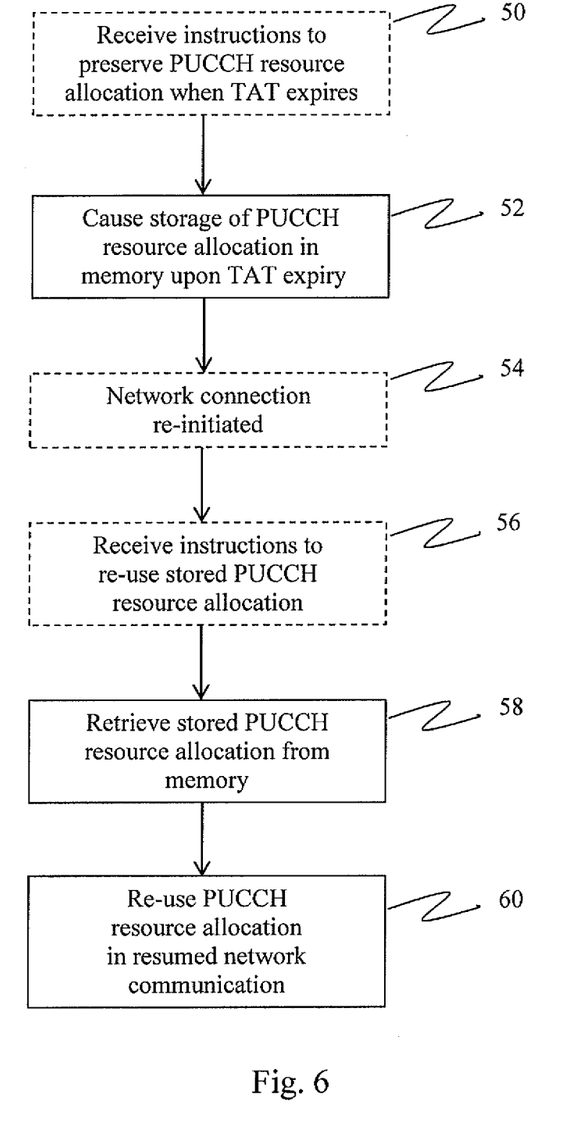
FIG. 6 is a flow diagram of one embodiment of the invention.

Referring to FIG. 6, a flow chart of an embodiment corresponding to a method for optimizing PUCCH resources is illustrated. In a first block 50 an apparatus 20 embodied by a UE 10 may include means, such as the processor 22, the communications interface 28, or the like, for receiving an instruction to preserve the PUCCH resource allocation being used in connected mode when the TAT expires during a period of discontinuous communication. Having that information, the apparatus embodied by the UE may include means, such as the processor, the memory 24 or the like, for causing storage 52 of the PUCCH resource allocation when the TAT expires. The PUCCH resource allocation may be stored in the UE's local memory. At a later time the network connection is re-initiated 54 such as by RA signaling between the UE and a network node. The signaling diagram of FIG. 3 illustrates one example of the signal exchange that re-initiates the connection. The apparatus embodied by the UE may also include means, such as the processor, the communications interface or the like, for receiving an instruction 56 to re-use the stored PUCCH resources that were used in the last communication session. The apparatus embodied by the UE also includes means, such as the processor or the like, for retrieving 58 the stored PUCCH allocation from memory and re-using 60 the retrieved PUCCH resources in the resumed network communication.

Both the network and the user may realize advantages from the re-use scheme of the invention. The network may benefit from a reduction of signaling load in the air interface when new traffic between eNB and a UE occurs. The UE may benefit from lower latencies when re-starting the data transmission.

The technique of an example embodiment of the invention may cause somewhat larger reservation of PUCCH resources. However, this causes much less effort in the network side compared to the reduction in overall signaling load. Additionally there remains the option for the network to release the PUCCH resources when it may be necessary or desirable for PUCCH usage to be reduced.

As described above, FIG. 6 illustrates a flowchart of an apparatus, method, and computer program product from the perspective of a mobile terminal and a network entity, respectively, according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a non-transitory memory device of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a non-transitory computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the dashed boxes in FIG. 6. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a message to preserve physical uplink control channel by a user equipment, and
   causing the physical uplink control channel resource allocation to be kept stored by the user equipment upon receipt of the message.

2. The method of claim 1 wherein the message is received upon expiration of a time alignment timer.

3. A method according to claim 1 further comprising re-initiating a connection with a network using random access channel signaling.

4. A method according to claim 1 further comprising receiving a message during re-initiation of the connection with the network node that instructs the stored physical uplink control channel resources to be re-used.

5. A method according to claim 4 further comprising receiving the physical uplink control channel resources message in at least one of a random access response message and contention resolution message.

6. A method according to claim 3 further comprising retrieving the stored physical uplink control channel resources.

7. A method according to claim 6 further comprising employing the stored and retrieved uplink control channel resources in re-initiated network communications.

8. An apparatus comprising:
   at least one processor, one communications interface, computer program code, and at least one memory that cause the apparatus to at least:
   preserve physical uplink channel resources by a user equipment, and cause the physical uplink control channel resource allocation to be kept stored by the user equipment.

9. An apparatus according to claim 8, wherein the preservation of the physical uplink control channel resources occurs at expiration of a time alignment timer.

10. An apparatus according to claim 8 wherein the at least one processor, communications interface, memory and the computer program code are further configured to receive an instruction re-initiating a connection with a network using random access channel signaling.

11. An apparatus according to claim 8 wherein the at least one processor, communications interface, memory and the computer program code are further configured to:
   receive a message during re-initiation of the connection with the network node that instructs the stored physical uplink control channel resources to be re-used.

12. An apparatus according to claim 11 wherein the at least one processor, communications interface, memory and the computer program code are further configured to:
   receive the message instructing the re-use of the physical uplink channel resources in at least one of a random access response message and contention resolution message.

13. The apparatus according to claim 8 or wherein the at least one processor, communications interface, memory and the computer program code are further configured to retrieve the stored physical uplink control channel resources.

14. The apparatus according to claim 13 wherein the at least one processor, communications interface, memory and the computer program code are further configured to employ the stored and retrieved uplink control channel resources in re-initiated network communications.

15. A computer program product comprising at least one non-transitory computer-readable storage medium having executable computer-readable program code instructions stored therein, the computer-readable program code instructions configured to:
   enable receipt of a message to preserve physical uplink control channel resources by a user equipment, and
   cause the physical uplink control channel resource allocation to be stored by the user equipment upon receipt of the message.

16. The computer program product of claim 15 wherein the message to preserve the physical uplink control channel resources is received upon expiration of a time alignment timer.

17. The computer program product of claim 15 further comprising instructions configured to:
   re-initiate a connection with a network node using random access signaling.

18. The computer program product of claim 15 further comprising instructions configured to:
   cause re-use of the stored physical uplink control channel resources upon re-initiation of network communication after a period of inactivity.

\* \* \* \* \*